United States Patent
Moyal et al.

(10) Patent No.: US 12,417,601 B2
(45) Date of Patent: Sep. 16, 2025

(54) VOLUMETRIC VIDEO MODIFICATION USING A VIRTUAL REALITY SYSTEM

(71) Applicant: INTERNATIONAL BUSINESS MACHINES CORPORATION, Armonk, NY (US)

(72) Inventors: Shailendra Moyal, Pune (IN); Sarbajit K. Rakshit, Kolkata (IN)

(73) Assignee: International Business Machines Corporation, Armonk, NY (US)

(*) Notice: Subject to any disclaimer, the term of this patent is extended or adjusted under 35 U.S.C. 154(b) by 329 days.

(21) Appl. No.: 18/163,905

(22) Filed: Feb. 3, 2023

(65) Prior Publication Data

US 2024/0265655 A1     Aug. 8, 2024

(51) Int. Cl.
    *G06T 19/20*    (2011.01)
    *G06T 15/20*    (2011.01)

(52) U.S. Cl.
    CPC ............. *G06T 19/20* (2013.01); *G06T 15/20* (2013.01); *G06T 2200/24* (2013.01); *G06T 2219/2004* (2013.01)

(58) Field of Classification Search
CPC ..... G06T 19/20; G06T 15/20; G06T 2200/24; G06T 2219/2004
See application file for complete search history.

(56) References Cited

U.S. PATENT DOCUMENTS

| | | | |
|---|---|---|---|
| 10,810,791 B2 | 10/2020 | Khalid | |
| 10,984,591 B2 | 4/2021 | Horsman | |
| 11,006,091 B2 | 5/2021 | Liu | |
| 2020/0169717 A1* | 5/2020 | Zavesky | G06V 10/751 |
| 2020/0334447 A1* | 10/2020 | Liu | G06F 16/7837 |

FOREIGN PATENT DOCUMENTS

| | | | | |
|---|---|---|---|---|
| WO | WO-2019076503 A1 * | 4/2019 | ............. | H04N 19/17 |
| WO | WO-2021173004 A1 * | 9/2021 | ........... | G06V 10/803 |

OTHER PUBLICATIONS

Antunes, "Canon and IBM: using volumetric video to promote visual arts," ProVideo Coalition, Jul. 13, 2021, https://www.provideocoalition.com/canon-and-ibm-using-volumetric-video-to-promote-visual-arts/, 9 pages.

Author Unknown, "Canon and IBM Japan Form Joint Business Operation Utilizing Volumetric Video Technology to Promote the Visual and Performing Arts," Canon Singapore, Jul. 7, 2021, https://sg.canon/en/consumer/form-joint-utilizing-volumetric-video-technology/news, 3 pages.

(Continued)

*Primary Examiner* — Said Broome
*Assistant Examiner* — Denis Vasiliy Minko
(74) *Attorney, Agent, or Firm* — Michael O'Keefe

(57) ABSTRACT

According to one embodiment, a method, computer system, and computer program product for volumetric video modification is provided. The embodiment may include generating a volumetric video from a multi-camera feed. The embodiment may also include presenting the generated volumetric video to a user. The embodiment may further include receiving one or more user inputs to the presented volumetric video. The embodiment may also include modifying the volumetric video based on the one or more user inputs. The embodiment may further include presenting the modified volumetric video to the user.

17 Claims, 3 Drawing Sheets

(56) References Cited

OTHER PUBLICATIONS

Cohen, "Welcome to the Netaverse, Where Brooklyn Nets Players Can Be Seen in a Whole New (3D) Light," SPORTTECHIE, Feb. 3, 2022, https://www.sporttechie.com/welcome-to-the-netaverse-where-brooklyn-nets-players-can-be-seen-in-a-whole-new-3d-light, 5 pages.
Disclosed Anonymously, "Updating Electronic Map with Real-time Volumetric Video for Effective Driving," IP.com, IP.com No. IPCOM000270860D, IP.com Publication Date: Sep. 2, 2022, 4 pages.
Griffin et al., 6DIVE: 6 Degrees-of-Freedom Immersive Video Editor, Frontiers in Virtual Reality, Original Research, Jun. 14, 2021, vol. 2, Article 676895, https://www.frontiersin.org/articles/10.3389/frvir.2021.676895/full, 16 pages.
IBM, "Canon, Inc. and IBM Launch Collaboration in Entertainment and the Arts in Japan," IBM Newsroom, Jul. 15, 2021, https://newsroom.ibm.com/2021-07-15-Canon,-Inc-and-IBM-Launch-Collaboration-in-Entertainment-and-the-Arts-in-Japan, 3 pages.
Kirch et al., "Vologan: Adversarial Domain Adaptation For Synthetic Depth Data," arXiv:2207.09204v1 [cs.CV] Jul. 19, 2022, https://arxiv.org/abs/2207.09204, 19 pages.
Perkins, "From healthcare to retail, 3D volumetric video is set to transform entire industries," Business BT, Jun. 17, 2021, https://business.bt.com/insights/the-future-is-now/transforming-industries-with-volumetric-video/, 10 pages.
Zhang et al., "NeuVV: Neural Volumetric Videos with Immersive Rendering and Editing," arXiv:2202.06088v1 [cs.CV] Feb. 12, 2022, https://arxiv.org/abs/2202.06088, 18 pages.

* cited by examiner

VOLUMETRIC VIDEO MODIFICATION USING A VIRTUAL REALITY SYSTEM

BACKGROUND

The present invention relates generally to the field of computing, and more particularly to volumetric video.

Volumetric video relates to image capture of a subject using multiple capture feeds that, during post processing, are sequenced together to create an image with three-dimensional volume and is viewable from multiple angles based on the placement of each photographic capture device. Volumetric video, or volumetric capture, may be utilized in many technologic fields, including, but not limited to, hologram generation, three-dimensional environments, augmented reality, visual effects, video gaming, and virtual reality, and in a number of industries, including music, virtual productions and sports, fashion, and documentaries. Several techniques for capturing volumetric video currently exist and may be used in isolation or in combination, such as photogrammetry, LiDAR, motion capture, 360° video cameras, and light field cameras.

SUMMARY

According to one embodiment, a method, computer system, and computer program product for volumetric video modification is provided. The embodiment may include generating a volumetric video from a multi-camera feed. The embodiment may also include presenting the generated volumetric video to a user. The embodiment may further include receiving one or more user inputs to the presented volumetric video. The embodiment may also include modifying the volumetric video based on the one or more user inputs. The embodiment may further include presenting the modified volumetric video to the user.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
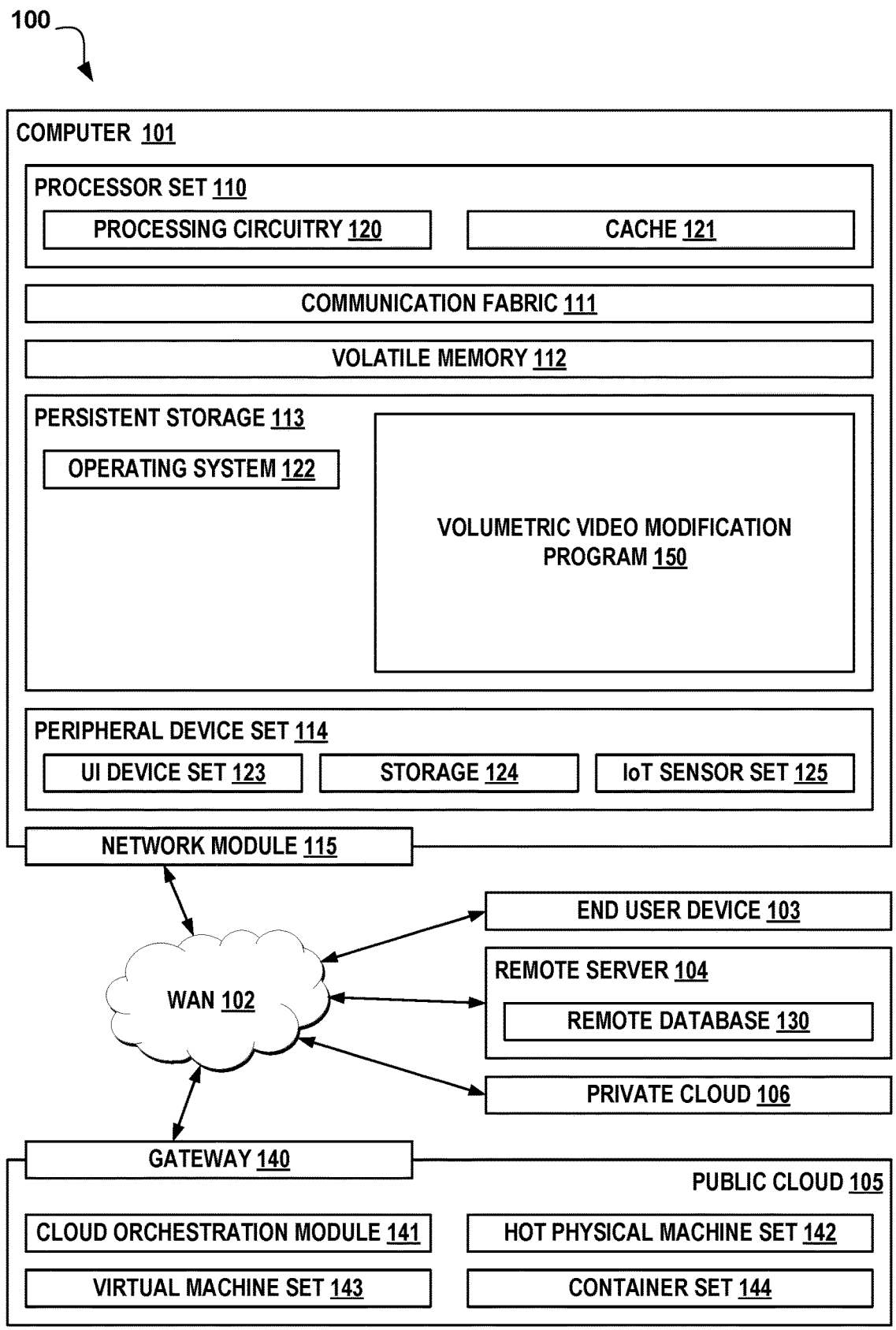
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to volumetric video. The following described exemplary embodiments provide a system, method, and program product to, among other things, provide modification of volumetric video through virtual reality (VR) navigation and user interactions within a generated video. Therefore, the present embodiment has the capacity to improve the technical field of volumetric video by allowing for dynamic modifications to existing volumetric videos based on user interactions with individual image capture feeds within the video.

As previously described, volumetric video relates to image capture of a subject using multiple capture feeds that, during post processing, are sequenced together to create an image with three-dimensional volume and is viewable from multiple angles based on the placement of each photographic capture device. Volumetric video, or volumetric capture, may be utilized in many technologic fields, including, but not limited to, hologram generation, three-dimensional environments, augmented reality, visual effects, video gaming, and virtual reality, and in a number of industries, including music, virtual productions and sports, fashion, and documentaries. Several techniques for capturing volumetric video currently exist and may be used in isolation or in combination, such as photogrammetry, LiDAR, motion capture, 360° video cameras, and light field cameras.

Volumetric video technology leverages camera and advanced data processing to render three-dimensional images from a virtual space, which allows for video point of views to be generated from any angle within that space allowing for a more immersive experience for viewers. Using volumetric video, a user can view media from various directions including through interactions using a VR system (e.g., a VR headset), three-dimensional display, or any two-dimensional display. Furthermore, volumetric video allows users to navigate through the volumetric space and perform various, different directional movements within the video itself. However, while interacting with volumetric video, a user may wish to edit a particular aspect of the video to either correct an error or make improvements to the video, such as adding content to the existing video or removing a specific item of content from the existing video. If one or more objects in the original volumetric video are to be adapted or modified, alignment with existing elements of the volumetric video is required to maintain consistency within the volumetric video space. As such, it may be advantageous to, among other things, implement an editing system for volumetric video that allows a user to identify specific aspects the user wishes to modify and then ensure all elements of the resultant video are in alignment for a consistent experience.

According to one embodiment, a volumetric video modification program may receive one or more aspects for modification from a user engaging with a volumetric video. The volumetric video modification program may allow for a second volumetric video to be added in the selected location or range indicated by the user, remove a portion of the first volumetric video, reposition volumetric objects in the volumetric video, define or redefine the mobility path of one or more volumetric objects within the volumetric video, and allow for user modifications of rule definitions for object mobility paths and speed of the virtual object inside the volumetric video. Once the modifications are implemented, the volumetric video modification program may regenerate the volumetric video with the corresponding updates.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring now to FIG. 1, computing environment 100 contains an example of an environment for the execution of at least some of the computer code involved in performing the inventive methods, such as volumetric video modification program 150. In addition to volumetric video modification program 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and volumetric video modification program 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, for illustrative brevity. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in volumetric video modification program 150 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in volumetric video modification program 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN 102 and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to at least one embodiment, the volumetric video modification program 150 may receive user interactions indicative of user-desired modifications to a volumetric video. The volumetric video modification program 150 may generate a second volumetric video that incorporates the indicated modifications from the user. While generating the second volumetric video, the volumetric video modification program 150 may adapt various elements from the first volumetric video that are impacted or affected by user-desired modifications, such as object flight path direction and speed or resultant shadows. The volumetric video modification program 150 may utilize a generative adversarial network when adapting such elements. Additionally, the volumetric video modification program 150 may also interact with one or more interactive systems, such as a virtual reality system (e.g., VR headset, controller(s), etc.), an augmented reality system, and a two-dimensional display. Furthermore, notwithstanding depiction in computer 101, the volumetric video modification program 150 may be stored in and/or executed by, individually or in any combination, end user device 103, remote server 104, public cloud 105, and private cloud 106. The volumetric video modification method is explained in more detail below with respect to FIGS. 2 and 3.

Figure 2:
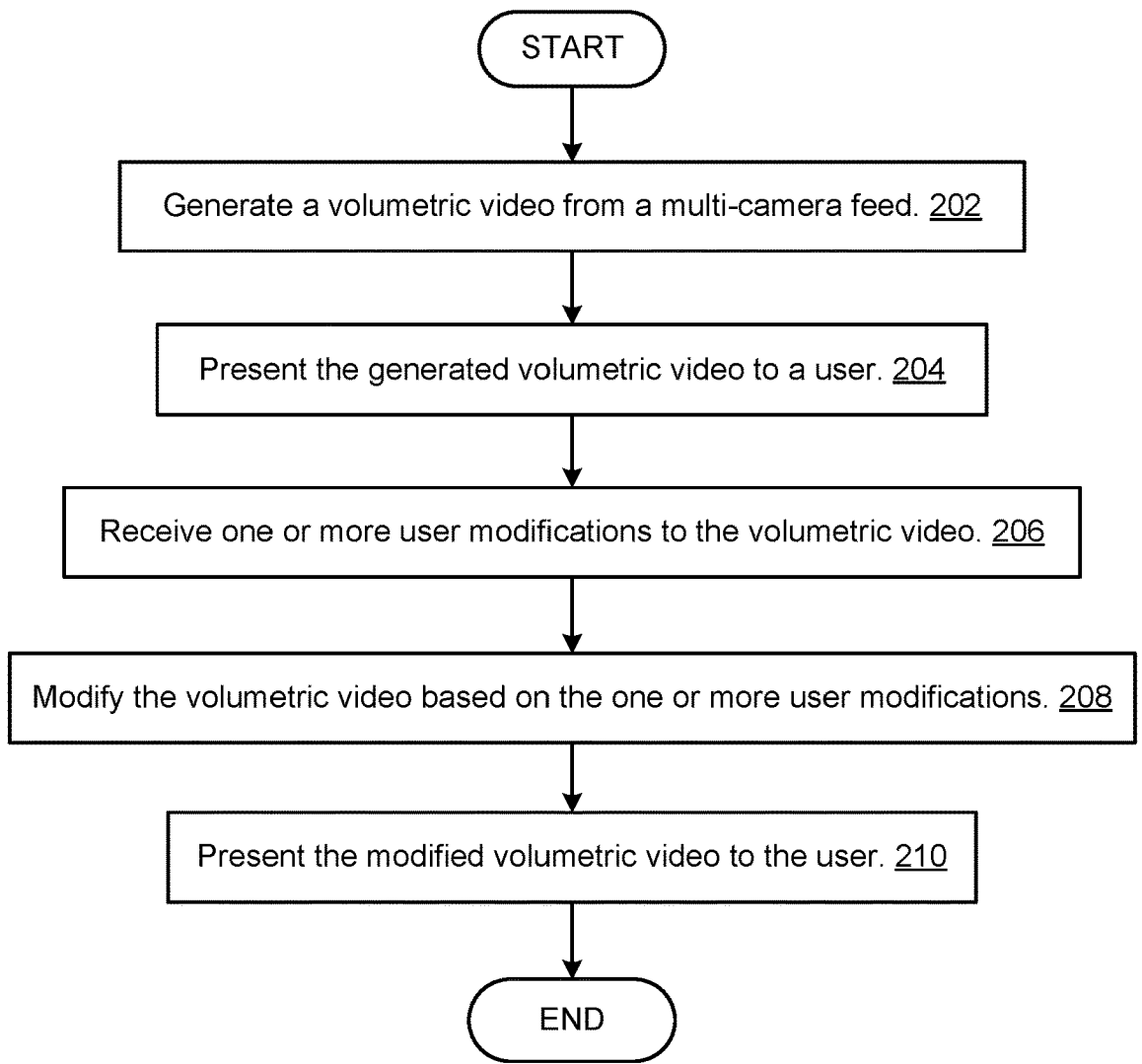
FIG. 2 illustrates an operational flowchart for a volumetric video modification process according to at least one embodiment.

Referring now to FIG. 2, an operational flowchart for a volumetric video modification process 200 is depicted, according to at least one embodiment. At 202, the volumetric video modification program 150 generates a volumetric video from a multi-camera feed. The volumetric video modification program 150 may receive a multi-camera feed from image and/or video capture devices and generate a volumetric video of an environment from the received feeds. In one or more embodiments, the image and/or video capture devices may be distributed at different locations in order to capture the environment from various distances and angles thus creating a volumetric video that can be viewed from multiple points of view. For example, the volumetric video modification program 150 may receive a multi-camera feed from video cameras distributed around the seating areas and field level locations of a sports stadium in order to generate a volumetric video of a sporting event taking place in the stadium.

Next, at 204, the volumetric video modification program 150 presents the generated volumetric video to a user. Once generation of the volumetric video is complete, the volumetric video modification program 150 may present the generated video to the user on one or more display screens through one or more presentation technologies, such as, but not limited to, a virtual reality system (e.g., VR headset, controller(s), etc.), an augmented reality system, and a two-dimensional display. The volumetric video modification program 150 may allow the user to engage with the volumetric video in any standard operation method including presentation only and editor modes. For example, continuing the previous example, the volumetric video modification program 150 may present the volumetric video of a sporting event, as captured through a multi-camera feed throughout a stadium, through a virtual reality headset.

Then, at 206, the volumetric video modification program 150 receives one or more user modifications to the volumetric video. The volumetric video modification program 150 may allow the user to interact with the volumetric video in a manner consistent with the presentation style. The volumetric video modification program 150 may capture user interactions that are consistent with a user's desire to modify the volumetric video. For example, a user interacting with a volumetric video of a sporting event through a virtual reality headset may utilize one or more controllers communicatively coupled to the virtual reality headset, or an accompanying computing device (e.g., computer 101), to indicate various aspects of the video the user wishes to modify. The volumetric video modification program 150 may allow, through one or more peripheral devices (e.g., peripheral device set 114), selection of an object or region within the volumetric video that the user wishes to modify and a manner in which the user wishes to modify the object or region, such as removing an object, adding an object, and altering object trajectory and/or speed. For example, continuing the previous example, if a user is editing clips from a sporting event and wishes to create a highlight from a field-level angle but spectators and objects are blocking the specific angle that the user editor wishes to show, the volumetric video modification program 150 may capture user selection of the view-obscuring spectators and objects in the volumetric video and perform a delete action. Similarly, a user may be editing a volumetric video of a vista landscape captured using a multi-feed camera system where the user wishes to remove a flock of birds that are flying around and perching on a tree. To indicate to the volumetric video modification program 150 that removal of the birds is desired, the user may select the individual birds, as objects within the volumetric video, and either select each object's deletion or trajectory modification from the volumetric video using peripheral control devices.

Next, at 208, the volumetric video modification program 150 modifies the volumetric video based on the one or more user modifications. Based on the received user interactions, the volumetric video modification program 150 may modify the volumetric video accordingly. As previously described, the volumetric video modification program 150 may perform an addition action, a deletion action, and/or a modification action. An addition action may relate to a user's desire to have a new element added into the volumetric video at a specific area or location. For example, if the user wishes to add flowers to the previously described vista landscape. A deletion action may relate to a user's desire to remove an element within the volumetric video so that it no longer appears. For example, if a bird's flight trajectory obscures an element of a volumetric video that an editors wishes a viewer to see unobstructed. A modification action may relate to a user's desire to change the appearance or orientation of an existing element within the volumetric video. For example, if the volumetric video is presenting a tutorial on how to play basketball, the user editor may wish to change the way an demonstrator in the volumetric video is bouncing the basketball to highlight proper dribbling form.

When regardless of whether adding new elements, deleting existing elements, or modifying elements in the volumetric video, the volumetric video modification program 150 may add one or more second volumetric video clips to a portion of the first volumetric video. Depending on the user-desired action, the volumetric video modification program 150 may use the second volumetric video to add an element, remove an element, or modify an existing element. In one or more embodiments, whereas the first volumetric video may be generated through image and/or video capture form a multi-feed camera system, the second volumetric video may not be a captured image or video, but rather a computer-generated alteration of the first volumetric video. In one or more other embodiments, the volumetric video modification program 150 may utilize a library of second volumetric videos to add onto, delete from, or modify within the first volumetric video.

As exemplary of this process, the volumetric video modification program 150 may receive interactions from a user that a modification of a volumetric video is desired. Specifically, the user wishes to change the trajectory of a bird flying around a landmark that is highlighted within the volumetric video. Using peripheral devices associated with a VR system, the user may indicate that a change in the height and speed of the bird's flight path is desired. Accordingly, the volumetric video modification program 150 may generate a second volumetric video for the portions of the first volumetric video that are affected by the user-desired updates. For instance, if the user wishes to lower the bird's flight path by 10 feet and increase its flight speed by 2 miles per hour, the volumetric video modification program 150 may generate the second volumetric video with these modifications.

To ensure consistency between all elements within the modified volumetric video from different areas of the original multi-camera feed used to generate the first volumetric video, the volumetric video modification program 150 may calculate future positions of the object (e.g., a mobility path of the object) based on the modifications and make spatiotemporal, consistency modifications as necessary throughout the volumetric video. For example, continuing the previous scenario, although the volumetric video modification program 150 may modify the bird's flight path as indicated by the user when the volumetric video modification program 150 generates the second volumetric video for replacement of corresponding sections within the first volumetric video, the volumetric video modification program 150 may also calculate the bird's flight path beyond the boundary of the user's modification area and perform appropriate modifications until the bird is no longer within the boundary of the volumetric video or the bird has looped back to a starting trajectory and begins the trajectory cycle anew. In one or more embodiments, the volumetric video modification program 150 may calculate these trajectory modifications when generating the second volumetric video for replacement of corresponding portions of the first volumetric video or the volumetric video modification program 150 may generate a third volumetric video that may incorporate these consistency aspects of modified elements within the second volumetric video that expand beyond the original spatiotemporal region of the second volumetric video. In one or more embodiments, the volumetric video modification program 150 may perform similar actions as described above for modified existing elements in situations where the user has indicated a desire to add an element or remove an element from the volumetric video.

Furthermore, the volumetric video modification program 150 may determine an impact on other elements caused by the user-desired modifications. For example, if the user desires an alteration to the bird's mobility path as indicated above, the volumetric video modification program 150 may identify that a shadow cast by the bird in the first volumetric video may not fall on the ground, or other volumetric video objects, at the appropriate time within the volumetric video. As such, the volumetric video modification program 150 may generate additional portions of volumetric video that place the bird's shadow at the appropriate location during the appropriate time. Such accurate calculations and renderings may be performed through artificial intelligence, ray tracing techniques, and three-dimensional modelling.

Then, at 210, the volumetric video modification program 150 presents the modified volumetric video to the user. The volumetric video modification program 150 may allow for playback of the modified volumetric video that corresponds to the updates made by the user editor in a variety of playback methods. Typically, the volumetric video modification program 150 may perform playback in a manner consistent with the playback method used to present the original volumetric video in step 202. However, any number of manners of playback of the modified volumetric video may be utilized, even if such playback differs in form from that used to playback the original volumetric video, including, but not limited to, a virtual reality system (e.g., VR headset, controller(s), etc.), an augmented reality system, and a two-dimensional display. Additionally, similar to the playback described in step 204, the volumetric video modification program 150 may allow the user to navigate within the volumetric video and indicate further modifications that would initiate a further round of editing in the volumetric video modification process 200.

Figure 3:
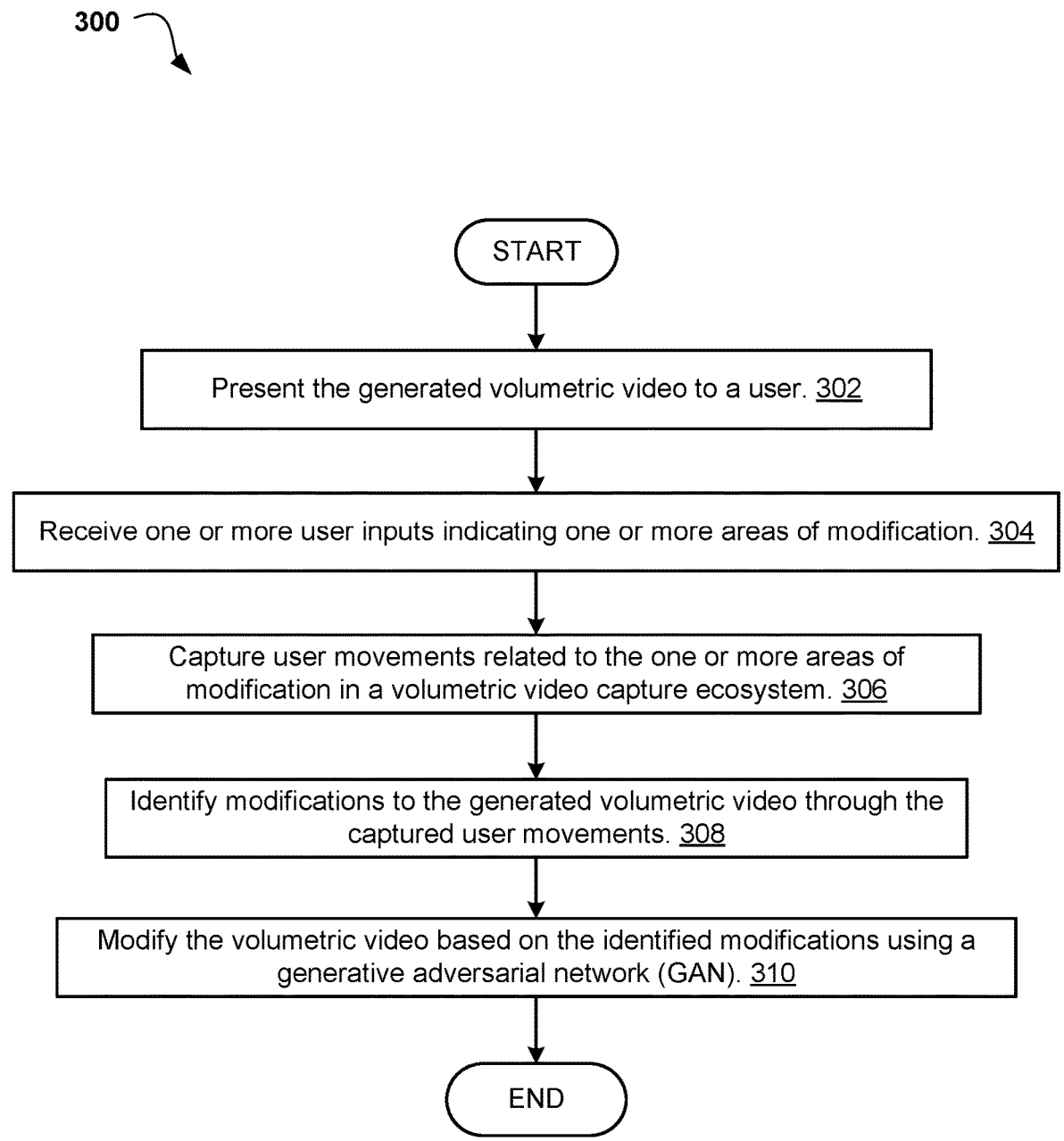
FIG. 3 illustrates an operational flowchart for a motion capture volumetric video modification process according to at least one embodiment.

Referring now to FIG. 3, an operational flowchart for a motion capture volumetric video modification process 300 is depicted according to at least one embodiment. In one or more further embodiments, the volumetric video modification program 150 may utilize motion capture technology when updating a volumetric video according to user specifications. At 302, the volumetric video modification program 150 presents the generated volumetric video to a user. Similar to step 204, the volumetric video modification program 150 may present the volumetric video to the use through one or more of a variety of presentation methods, such as, but not limited to, a virtual reality system (e.g., VR headset, controller(s), etc.), an augmented reality system, and a two-dimensional display. For example, a user creating a basketball tutorial video may capture initial footage through a motion capture ecosystem and may now view the volumetric video generated from that motion capture session using a virtual reality headset.

Then, at 304, the volumetric video modification program 150 receives one or more user inputs indicating one or more areas of modification. Similar to step 206, the volumetric video modification program 150 may receive user inputs indicating areas of the volumetric video that the user wishes to modify. For example, in the previous scenario with a user creating a basketball tutorial, the user may indicate that the dribbling hand position present in the original volumetric video is not to the user's liking and updates are desired. The user may indicate these changes through interactions with the volumetric video during an editing mode of the volumetric video modification program 150 and the program that is presenting the volumetric video using one or more devices from peripheral device set 114.

Next, at 306, the volumetric video modification program 150 captures user movements related to the one or more areas of modification in a volumetric video capture ecosystem. The volumetric video modification program 150 may allow a user to indicate the specific updates to be made to the volumetric video through postprocessing steps, similar to step 206, or the volumetric video modification program 150 may allow the user to recapture the desired video through one or more multi-camera capture methods and then analyze the recaptured footage. For example, if the user wishes to recapture hand movements for proper basketball dribbling form in the tutorial video mentioned previously, the volumetric video modification program 150 may utilize the motion capture ecosystem to recapture hand movements that correspond to the proper form desired by the user.

Then, at 308, the volumetric video modification program 150 identifies modifications to the generated volumetric video through the captured user movements. The volumetric video modification program 150 may identify the specific modifications to institute through analysis of the original volumetric video and the recaptured volumetric video with a focus on the specific areas indicated by the user inputs from step 304 and calculating a deviation between the two videos. For example, if the user indicated the hand position and wrist angle of a person dribbling a basketball in a tutorial video were at issue and indicated as such in step 204, the volumetric video modification program 150 may compare measurement values associated the wrist angle and hand position of the dribbler in the original volumetric video and the recaptured volumetric video so a deviation between the each positional value may be calculated and proper modification may be performed in step 310 to minimize the deviation to an optimal level or so that not deviation remains.

Next, at 310, the volumetric video modification program 150 modifies the volumetric video based on the identified modifications using a generative adversarial network (GAN). In one embodiment, the volumetric video modification program 150 may modify the generated volumetric video using either a portion of the captured user movements as a second volumetric video replacing one or more elements of the original, generated volumetric video or, in at least one other embodiment, the volumetric video modification program 150 may automatically make updates to the original, generated volumetric video, using a GAN, by analyzing the recaptured volumetric video in a multi-camera ecosystem. For example, continuing the example of a user utilizing a motion capture system to generate a basketball tutorial, if the user indicated in step 304 that a dribbling hand position is not correct and, in 306, recaptured the movements with focus on proper hand position, the volumetric video modification program 150 may either edit a portion of the recaptured volumetric video to the original volumetric video so that proper hand position is show or the volumetric video modification program 150 may analyze the recaptured volumetric video to determine post processing changes that should be implemented to the original volumetric video so that proper dribbling hand position is demonstrated. The volumetric video modification program 150 may utilize one or more post processing techniques to modify the original volumetric video. For example, the volumetric video modification program 150 may determine that wrist angle and hand position are not proper in the original volumetric video and may accordingly modify the original volumetric video so that proper wrist angle and hand position are shown.

It may be appreciated that FIG. 2 provides only an illustration of one implementation and does not imply any limitations with regard to how different embodiments may be implemented. Many modifications to the depicted environments may be made based on design and implementation requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method, the method comprising:
   generating a volumetric video from a multi-camera feed;
   presenting the generated volumetric video to a user;
   receiving one or more user inputs to the presented volumetric video;
   modifying the volumetric video based on the one or more user inputs, wherein the modifying further comprises:
      capturing a second volumetric video;
      identifying a deviation between the generated volumetric video and the second volumetric video associated with the one or more user inputs; and
      modifying the generated volumetric video by the deviation so that an area associated with a user input within the one or more user inputs in the generated volumetric video corresponds to a value associated with the second volumetric video; and
   presenting the modified volumetric video to the user.

2. The method of claim 1, wherein the receiving further comprises:
   receiving a user selection of one or more objects of the generated volumetric video; and
   receiving an action to perform on each user selection.

3. The method of claim 2, wherein the modifying further comprises:
  generating a second volumetric video corresponding to an area around each user selection;
  performing the action to the one or more objects in the second volumetric video; and
  replacing a segment of the generated volumetric video that corresponds to the second volumetric video.

4. The method of claim 3, wherein the modifying further comprises:
  performing one or more consistency modifications to the generated volumetric video outside the area around each user selection that adapt each object in the generated volumetric video to minimize an impact of the replaced segment to the generated volumetric video.

5. The method of claim 1, wherein the modifying is performed through a generative adversarial network.

6. The method of claim 1, wherein the one or more user inputs are selected from a group consisting of an addition action, a deletion action, and a modification action.

7. A computer system, the computer system comprising:
  one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
  generating a volumetric video from a multi-camera feed;
  presenting the generated volumetric video to a user;
  receiving one or more user inputs to the presented volumetric video;
  modifying the volumetric video based on the one or more user inputs, wherein the modifying further comprises:
    capturing a second volumetric video;
    identifying a deviation between the generated volumetric video and the second volumetric video associated with the one or more user inputs; and
    modifying the generated volumetric video by the deviation so that an area associated with a user input within the one or more user inputs in the generated volumetric video corresponds to a value associated with the second volumetric video; and
  presenting the modified volumetric video to the user.

8. The computer system of claim 7, wherein the receiving further comprises:
  receiving a user selection of one or more objects of the generated volumetric video; and
  receiving an action to perform on each user selection.

9. The computer system of claim 8, wherein the modifying further comprises:
  generating a second volumetric video corresponding to an area around each user selection;
  performing the action to the one or more objects in the second volumetric video; and
  replacing a segment of the generated volumetric video that corresponds to the second volumetric video.

10. The computer system of claim 9, wherein the modifying further comprises:
  performing one or more consistency modifications to the generated volumetric video outside the area around each user selection that adapt each object in the generated volumetric video to minimize an impact of the replaced segment to the generated volumetric video.

11. The computer system of claim 7, wherein the modifying is performed through a generative adversarial network.

12. The computer system of claim 7, wherein the one or more user inputs are selected from a group consisting of an addition action, a deletion action, and a modification action.

13. A computer program product, the computer program product comprising:
  one or more computer-readable tangible storage medium and program instructions stored on at least one of the one or more tangible storage medium, the program instructions executable by a processor capable of performing a method, the method comprising:
  generating a volumetric video from a multi-camera feed;
  presenting the generated volumetric video to a user;
  receiving one or more user inputs to the presented volumetric video;
  modifying the volumetric video based on the one or more user inputs, wherein the modifying further comprises:
    capturing a second volumetric video;
    identifying a deviation between the generated volumetric video and the second volumetric video associated with the one or more user inputs; and
    modifying the generated volumetric video by the deviation so that an area associated with a user input within the one or more user inputs in the generated volumetric video corresponds to a value associated with the second volumetric video; and
  presenting the modified volumetric video to the user.

14. The computer program product of claim 13, wherein the receiving further comprises:
  receiving a user selection of one or more objects of the generated volumetric video; and
  receiving an action to perform on each user selection.

15. The computer program product of claim 14, wherein the modifying further comprises:
  generating a second volumetric video corresponding to an area around each user selection;
  performing the action to the one or more objects in the second volumetric video; and
  replacing a segment of the generated volumetric video that corresponds to the second volumetric video.

16. The computer program product of claim 15, wherein the modifying further comprises:
  performing one or more consistency modifications to the generated volumetric video outside the area around each user selection that adapt each object in the generated volumetric video to minimize an impact of the replaced segment to the generated volumetric video.

17. The computer program product of claim 13, wherein the modifying is performed through a generative adversarial network.

* * * * *